United States Patent [19]

Vig et al.

[11] 4,274,907

[45] Jun. 23, 1981

[54] METHOD OF CHEMICALLY POLISHING A DOUBLY ROTATED QUARTZ PLATE

[75] Inventors: John R. Vig, Colts Neck; Ronald J. Brandmayr, Ocean, both of N.J.

[73] Assignee: The United States of America as represented by the Secretary of the Army, Washington, D.C.

[21] Appl. No.: 147,778

[22] Filed: May 8, 1980

[51] Int. Cl.³ .................... C03C 15/00; C03C 19/00
[52] U.S. Cl. .................................. 156/637; 156/645; 156/663; 252/79.3
[58] Field of Search ............... 156/663, 645, 647, 637; 252/79.3

[56] References Cited

U.S. PATENT DOCUMENTS

| | | | |
|---|---|---|---|
| 2,479,286 | 8/1949 | Wolfskill | 156/645 |
| 3,932,777 | 1/1976 | King | 310/8 |

OTHER PUBLICATIONS

Judge, "A Study . . . Fluoride," *Journal of the Electro Chemical Society*, vol. 118, (1975), pp. 1772–1775.
Bond, *Zeitschrift fur Kristallographic*, Band 99, (1938), pp. 488–498.
Vig et al., "Chemically Polished Quartz," Research and Development Tech. Report Ecom., 4548, (11/77), pp. 131–143.
Iida et al., "Selective Etching . . . System," J. Electro Chemical Soc., vol. 118, No. 5, (5/71), pp. 768–771.
Vig et al., "Etching . . . Plates," 33rd Annual Symposium on Frequency Control, (5/79–6/79).
"System of Rotation . . . Crystalline Bars and Plates," IEEE Standard, 176—1978, (pp. 25–27).

*Primary Examiner*—Jerome W. Massie
*Attorney, Agent, or Firm*—Nathan Edelberg; Jeremiah G. Murray; Roy E. Gordon

[57] ABSTRACT

At least one side of a doubly rotated quartz plate whose theta ($\theta$) angle is between about 33° and 36° and whose phi ($\phi$) angle is between about 10° and 26° is chemically polished by lapping the quartz plate with an abrasive and etching the lapped quartz plate in a fluoride type etchant selected from the group consisting of a 5 percent to 25 percent solution of hydrofluoric acid, a 5 percent to 50 percent solution of ammonium bifluoride, and a mixture of 40 percent ammonium fluoride with 49 percent hydrofluoric acid in the ratio ranging from about 1:3 to 10:1, the etching being carried out until a thickness is removed from the plate that is at least twice the average abrasive particle diameter in the final lapping abrasive.

51 Claims, No Drawings

METHOD OF CHEMICALLY POLISHING A DOUBLY ROTATED QUARTZ PLATE

The invention described herein may be manufactured, used and licensed by or for the Government for governmental purposes without the payment to us of any royalty thereon.

BACKGROUND OF THE INVENTION

This invention relates in general to a method of chemically polishing doubly rotated quartz plates, and in particular, to a method of chemically polishing a doubly rotated quartz plate whose $\theta$ (theta) angle is between about 33° and 36° and whose $\phi$ (phi) angle is between about 10° and 26°, where $\phi$ and $\theta$ are the angles of cut as defined in the "IEEE Standard on Piezo-electricity", Standard No. 176-1978. The application is copending with U.S. patent application Ser. No. 919,113 filed 6/26/78 by Vig et al. for "Method of Treating A Quartz Plate" and assigned to a common assignee.

STATEMENT OF THE PRIOR ART

High precision and high frequency quartz resonators, particularly those for high shock applications, require quartz plates whose surfaces are free of imperfections, such as scratches and pits. The most common method of achieving such surfaces has been mechanical polishing. The difficulty with mechanical polishing, however, has been its inability to produce defect-free surfaces, at the correct frequency, with a high yield. Moreover, as has been known since the last century, even when the polished surfaces appear to be free of defects when examined at high magnification, the surfaces contain hidden defects. These defects can be revealed by etching subsequent to polishing.

In Ser. No. 919,113, it was disclosed and claimed that when lapped AT-cut quartz plates were etched in a saturated solution of ammonium bifluoride ($NH_4F.HF$), the surface roughness decreased with increasing depth of etching, that is, the plates were chemically polished. Experiments on other cuts of quartz have shown that etching in a saturated solution of ammonium bifluoride can also polish the singly rotated BT and ST-cuts but not the doubly rotated 10° V, FC, IT and SC-cuts. The surfaces of these doubly rotated cuts become rougher with increasing depth of etching in a saturated solution of ammonium bifluoride.

SUMMARY OF THE INVENTION

The general object of this invention is to provide a method of chemically polishing a doubly rotated quartz plate. A more particular object of the invention is to provide such a method that will chemically polish a doubly rotated quartz plate whose theta angle is between about 33° and 36° and whose phi angle is between about 10° and 26°. A particular object of the invention is to provide a method of chemically polishing an SC-cut doubly rotated quartz plate. Another object of the invention is to provide a method of making quartz plates of great strength suitable for high shock resonator applications.

It has now been found that at least one side of a doubly rotated quartz plate whose theta angle is between about 33° and 36° and whose phi angle is between about 10° and 26° can be chemically polished by lapping the quartz plate with an abrasive and etching the lapped quartz plate in a fluoride type etchant selected from the group consisting of a 5 percent to 25 percent solution of hydrofluoric acid (HF), a 5 percent to 50 percent solution of ammonium bifluoride ($NH_4F.HF$), and a mixture of 40 percent ammonium fluoride with 49 percent hydrofluoric acid in the ratios ranging from about 1:3 to 10:1, said etching being carried out until a thickness is removed from the plate that is at least twice the average abrasive particle diameter in the final lapping abrasive.

Both sides of a doubly rotated quartz plate whose theta angle is between about 33° and 36° and whose phi angle is between about 10° and 26° can be chemically polished by lapping the quartz plate with an abrasive and etching the lapped quartz plate in a fluoride type etchant selected from the group consisting of a 5 percent to 11 percent solution of hydrofluoric acid (HF), a 5 percent to 25 percent solution of ammonium bifluoride ($NH_4F.HF$), and a mixture of 40 percent ammonium fluoride with 49 percent hydrofluoric acid in the ratios ranging from about 4:1 to 10:1 for phi angles ranging from 18° to 26°, and from about 3:1 to 10:1 for phi angles ranging from 10° to 18°, said etching being carried out until a thickness is removed from the plate that is at least twice the average abrasive particle diameter in the final lapping abrasive.

Etching can be considered as a five step process in which the etchant must diffuse to the surface, be adsorbed, react chemically, and the resulting reaction products must then be desorbed and diffuse away from the surface. The etching rate may be limited by any one of these steps. In chemical polishing, the rate controlling step is generally the diffusion to or from the surface. Diffusion control means that, in particular, the rate at which a reaction takes place at the surface is higher than the rate of diffusion, that is, the etchant molecules at the surface react at the rate which is faster than the rate at which the concentration at the surface can be replenished by the diffusion of other etchant molecules. A depleted surface layer therefore exists, outside which the etchant concentration is uniform, but inside which the concentration decreases to near zero at the surface.

Under such conditions, the etching is principally determined not by the properties of the surface being etched, but by the diffusion. It is clear that if a surface initially consists of hills and valleys, the probability of an etchant molecule diffusing to the top of a hill will be much greater than the probability of it diffusing to the bottom of a valley. The hills will therefore be etched faster than the valleys, and the surface will become increasingly smooth as the etching progresses.

Eventually, the surface becomes so smooth that the depleted layer can have a uniform thickness. From that point, the surface is etched evenly everywhere, and the surface smoothness no longer improves with further etching. Chemically polished surfaces are therefore not perfectly flat but are microscopically undulating.

For a given etchant, the time required to produce a chemically polished surface is primarily a function of: the etching bath temperature, the particle size distribution of the lapping abrasive used for final lapping the quartz plates, the angles of cut of the quartz plate and the etchant composition. The higher the etching bath temperature, the more rapidly the etching takes place, and the coarser the abrasive, the greater the amount of material which must be removed by etching in order to produce chemically polished surfaces. The details of how the chemical polishing is influenced by the etching bath temperature, abrasive particle size, and some other parameters is discussed in "Chemically Polished Quartz" by John R. Vig, John W. LeBus and Raymond L. Filler, published in the Proceedings of the 31st Annual Symposium on Frequency Control, June 1–3, 1977, in Research and Development Technical Report ECOM-4548, November 1977, and in "Etching Studies on Singly and Doubly Rotated Quartz Plates" by John R. Vig, Ronald J. Brandmayr and Raymond L. Filler, published in the Proceedings of the 33rd Annual Symposium on Frequency Control, May 30–June 1, 1979. For the aluminum oxide abrasives evaluated, the etching should remove from the thickness of the plates an amount which is at least twice the average particle diameter in the final abrasive. For example, if a 3 $\mu$m abrasive is used for final lapping the quartz plates, the chemical polishing process should remove at least 6 $\mu$m from the plate thicknesses in order to produce surfaces which can be described as chemically polished.

The angles of cut are also important variables since the inherent etching rates vary greatly with crystallographic direction. For example, in concentrated HF, the etching rate of quartz along the Z - direction is over 100 times higher than along -X direction. For the doubly rotated plates, in order to achieve chemical polishing, the etching solutions maximum HF concentration must decrease as the phi angle increases, e.g., a 3:1 solution will chemically polish the phi=14° cut, but for a phi=22° cut the concentration cannot be higher than 4:1.

The quality of quartz used is another important consideration. When chemical polishing is attempted on groups of plates made of several different cultured quartz varieties, it is found that for many of the plates the etching produces large numbers of undesirable etch pits and etch channels. This is particularly true for plates made of relatively low Q, fast grown materials. When plates made of natural quartz or swept (i.e., "electrolyzed") cultured quartz are used, the incidence of etch pits and etch channels is far fewer. Of the cultured quartz varieties, the one variety which has been vacuum swept in accordance with the method described in U.S. Pat. No. 3,932,777 issued Jan. 13, 1976 to James Claude King for "Vacuum Electrolysis of Quartz," has the lowest incidence of etch channels.

DESCRIPTION OF THE PREFERRED EMBODIMENT

EXAMPLE 1

Both sides of a (doubly rotated) SC-cut quartz plate are chemically polished by lapping the plate with a 3 $\mu$m aluminum oxide abrasive and then etching the lapped plate in a mixture of 40 percent ammonium fluoride with 49 percent hydrofluoric acid in the ratio of about 4:1 at an etching bath temperature of about 75° C. for about 120 minutes.

The chemical polishing process can remove large amounts of material from lapped plates while simultaneously producing an improved surface finish, without producing shifts in angles of cut. The process will also produce plates of great strength, which is particularly important for high shock applications.

The particular apparatus used to carry out the etching method is not critical. One particular apparatus that can be conveniently used includes a Teflon beaker that is externally heated by means of a temperature controlled heating jacket. The temperature of the etching solution can thus be controlled to about ±2° C. A thick Teflon disc with a diameter slightly larger than the outer beaker is used as a cover to minimize evaporation from the beaker. A hole through the center of the disc permits the agitation of crystals during etching.

The quartz plates are loosely held in a Teflon fixture which is designed to assure that only point contacts exist between the fixture and the plates. The plates are agitated slowly in both directions by means of a constant speed electric motor. The motor is set to rotate the etching fixture through an angle of approximately 360° before reversing direction. The rate of agitation is about 5 cycles per minute.

A convenient etching procedure involves first the preparation of a mixture of 40 percent ammonium fluoride with 49 percent hydrofluoric acid in the ratio of about 4:1 in a Teflon container. (The solution preparation and the etching are performed under a vented hood to prevent inhalation of the vapors from the etching bath.) Then, the plates are cleaned thoroughly. It is particularly important to remove all contaminants such as waxes and greases, which may be impervious to the etchant. Any number of cleaning techniques may be used, as long as contaminants that are impervious to the etchant are removed. One method which has consistently produced good results involves degreasing the plates with a solvent, followed by plasma cleaning. The crystal plates are then placed into the slots in the etching fixture and agitated ultrasonically in a detergent solution, then rinsed thoroughly in distilled water.

From the final rinse the plates are transferred, while wet, into the etching bath, and are shaken vigorously to make sure that there are no trapped air bubbles in the etching fixture. During etching, the plates are agitated in both directions.

After the plates reach the desired frequency, the etching fixture is removed rapidly from the etch bath and is immersed immediately into a container of hot water, given a thorough rinse under running hot water, then agitated ultrasonically in hot water, then given another rinse in running distilled water, then dried by spin drying. A thorough rinse is important in order to remove all residues of the etchant.

The plates are usually etched to the desired frequency by first measuring the etch rates as a function of temperature, selecting a suitable temperature between 20° C. and 90° C., calculating the etching time required to reach the desired frequency, and etching the plates for a time slightly less than the time calculated. The reason for etching for less than the time calculated is that experience has shown that there are slight variations from plate to plate in the rates at which quartz plates etch at a given temperature. In practice, therefore, in order to etch a group of quartz plates to a narrow range about a target frequency, an iterative procedure is often necessary. That is, the plates are etched for a time slightly less than the time calculated, then the plates are rinsed, dried and the frequencies are measured. Those plates whose frequency is within the target range are removed from the etching fixture, a new etching time is calculated for the remaining plates, the plates are etched again, rinsed, dried, measured, and the process is repeated until all the plates in the group have been etched to the proper frequency range.

The plates are then inspected under a microscope for uniformity of etch, and for defects such as scratch marks, etch pits and etch channels.

The inspection of etched plates is performed under a microscope at about 40 X magnification, with the light incidence perpendicular to the axis of the microscope and with using a black background. First, the plate is inspected for surface irregularities such as scratch marks, pits and twinned areas by tilting the plate so as to reflect light into the microscope. The crystal plate is then inspected for etch channels by holding it so that the light incidence is in the plane of the plate (i.e., edge illumination). The etch channels are most visible when the edge illumination is incident along a direction perpendicular to the direction of the channels. For example, in many types of cultured quartz, the etch channels tend to be along directions near the Z direction. These channels are most easily visible therefore with the light incident from the X direction. To help make the etch channels more visible without rotating the crystals, it is helpful to use for the edge illumination two lights incident at a right angle to each other, or a ring light. The etch channels appear as small, bright streaks which extend through the plate from one side to the other. The thicker the plate, the longer the streaks, and the deeper the plate has been etched, the brighter the streaks. To facilitate inspection for etch channels, it is desirable to etch the plates until a minimum of 16 $\mu$m is removed from the plate thicknesses.

Many abrasives are suitable for use in the method of the invention including aluminum oxide, silicon carbide, diamond, cerium oxide, and zirconium oxide. Abrasives having different particle size distributions and/or shapes, produce different equilibrium surface topographies upon chemical polishing. The more uniformly disturbed the surface is prior to etching, the smoother will be the chemically polished surface. Accordingly, one should lap the plates with progressively finer abrasives prior to etching. The final abrasive should be as fine as possible. It is highly desirable to have the average particle size in the final abrasive 5 micrometers or less.

The temperature at which the etching is performed can vary from about 20° C. to about 90° C. The higher the temperature, the faster the etch rate. A convenient etching temperature has been found to be 75° C.

During etching, proper agitation, preferably in both directions, is important to assure that the crystals are etched uniformly on both sides. Agitation also serves to minimize temperature gradients in the etch bath, which in turn minimizes plate to plate etch rate variations.

After lapped plates are polished chemically, the surfaces are microscopically undulating, i.e., the topographies consist of hills and valleys. In some high frequency applications, the undulations can scatter the acoustic waves and thereby degrade the resonators' Q. The undulations, however, can be removed by polishing the plates chemomechanically; that is, by combined chemical and mechanical action, for example, with cerium oxide and water, or with a colloidal silica polishing agent such as Syton as manufactured by Monsanto Company or Ludox as manufactured by DuPont Company. The chemoechanical polishing can produce a smooth, undamaged surface which remains smooth upon further etching.

EXAMPLE 2

One side of a doubly rotated SC-cut quartz plate is chemically polished by lapping the plate with a 1 $\mu$m aluminum oxide abrasive and then etching the lapped plate in a mixture of 40 percent ammonium fluoride with 49 percent hydrofluoric acid in the ratio of about 1:1 at an etching bath temperature of about 75° C. for about 20 minutes.

EXAMPLE 3

One side of a doubly rotated SC-cut quartz plate is chemically polished by lapping the plate with an 1 $\mu$m abrasive and then etching the lapped plate in a mixture of 40 percent ammonium fluoride with 49 percent hydrofluoric acid in the ratio of about 2:1 at an etching bath temperature of about 75° C. for about 30 minutes.

EXAMPLE 4

Both sides of a doubly rotated FC-cut quartz plate are chemically polished by lapping the plate with a 1 $\mu$m aluminum oxide abrasive and then etching the lapped plate in a mixture of 40 percent ammonium fluoride with 49 percent hydrofluoric acid in the ratio of about 3:1 at an etching bath temperature of about 75° C. until about 20 $\mu$m is removed from the plate thickness.

EXAMPLE 5

One side of a doubly rotated IT-cut quartz plate is chemically polished by lapping the plate with a 3 $\mu$m aluminum oxide abrasive and then etching the lapped plate in a mixture of 40 percent ammonium fluoride with 49 percent hydrofluoric acid in the ratio of about 3:1 at an etching bath temperature of about 75° C. for about 75 minutes.

EXAMPLE 6

Both sides of a doubly rotated SC-cut quartz plate are chemically polished by lapping the quartz plate with a 1 1 $\mu$m abrasive and then etching the lapped plate in a mixture of 40 percent ammonium fluoride with 49 percent hydrofluoric acid in the ratio of about 4:1 at an etching bath temperature of about 75° C. for about 120 minutes.

EXAMPLE 7

Both sides of a doubly rotated SC-cut quartz plate are chemically polished by lapping the quartz plate with a 1 $\mu$m abrasive and then etching the lapped plate in a mixture of 40 percent ammonium fluoride with 49 percent hydrofluoric acid in the ratio of about 5:1 at an etching bath temperature of about 80° C. until about 25 $\mu$m is removed from the plate thickness.

EXAMPLE 8

Both sides of a doubly rotated SC-cut quartz plate are chemically polished by lapping the quartz plate with a 1 $\mu$m abrasive and then etching the lapped abrasive in an 11 percent HF solution at an etching bath temperature of about 75° C. for about 150 minutes.

EXAMPLE 9

Both sides of a doubly rotated SC-cut quartz plate are chemically polished by lapping the quartz plate with a 1 $\mu$m abrasive and then etching the lapped plate in a dilute $NH_4F.HF$ solution prepared by mixing one part by weight of $NH_4F.HF$ flakes with 5 parts water, the etching carried out at an etching bath temperature of about 75° C. for about 180 minutes.

EXAMPLE 10

A doubly rotated SC-cut quartz plate is final lapped with a 1 micrometer aluminum oxide abrasive. The final lapped quartz plate is then etched in a 4:1 solution to a range from $\Delta f = 10 f_o f_f$ to $\Delta f = 16 f_o f_f$ where $\Delta f$ is the change in frequency in KHz and $f_o$ and $f_f$ are the initial and final frequencies, respectively, in MHz.

EXAMPLE 11

A doubly rotated SC-cut quartz plate is chemically polished on one side by final lapping with a 1 micron aluminum oxide abrasive. The plate is then thoroughly cleaned and etched in a mixture of 40 percent ammonium fluoride with 49 percent hydrofluoric acid in the ratio of about 1:3 while agitating the plate in both directions. The plate is etched until an amount of material is removed from the plate such that the thickness of the plate is reduced by an amount which is equal to at least twice the average particle size in the final lapping abrasive. The plate is removed from the etching solution after the desired frequency is reached and the plate thoroughly rinsed to remove all residues of the etchant.

EXAMPLE 12

A doubly rotated SC-cut quartz plate is chemically polished on both sides by final lapping the quartz plate with a 1 micron aluminum oxide abrasive. The plate is thoroughly cleaned and then etched in a mixture of 40 percent ammonium fluoride with 49 percent hydrofluoric acid in the ratio of about 10:1 while agitating the plate in both directions. The plate is etched until an amount of material is removed from the plate such that the thickness of the plate is reduced by an amount which is equal to at least twice the average particle size in the final lapping abrasive. The plate is removed from the etching solution after the desired frequency is reached and thoroughly rinsed to remove all residues of the etchant.

EXAMPLE 13

A group of four 5.3 MHz, fundamental mode, plano-convex 14 mm diameter chemically polished SC-cut resonators are made. The contours are 1.0 diopter for two of the blanks, 2.5 diopter for the other two. The blanks are etched $\Delta f = 15 f_o f_f$ in a solution of 5:1 of 40 percent NH$_4$F with 49 percent HF, at 75° C. The c-mode Q's are $1.2 \times 10^6$, $1.1 \times 10^6$, $1.0 \times 10^6$ and $0.96 \times 10^6$ (the b-mode Q's ranged from $0.53 \times 10^6$ to $1.3 \times 10^6$). The c-mode Q's are higher than the Q's achieved for 5 MHz fundamental mode AT-cut resonators of the same blank diameter, regardless of surface finish.

The method of the invention may allow manufacturers to stock lapped plates at only a few frequencies at each commonly used angle of cut and then etch the plates to the required frequencies as the need arises. The method may also permit the manufacturing of miniature contoured high frequency resonators since such small diameter resonators can now be contoured at conventional frequencies and then etched up to high frequencies. If a masking material that is resistant to the etch solution can be found, the method may also permit the fabrication of high frequency resonators and filters with the inverted mesa structure.

In addition to the SC-cut, the etching technique described has also been shown to be capable to chemically polishing at least one side of other doubly rotated quartz plates whose theta angle is between about 33° and 36° and whose phi angle is between about 10° and 26°. Such quartz plates include the FC-cut and IT-cut.

The reason that a particular etching solution can chemically polish one side of doubly rotated quartz plates but not the other side is believed to be due to the fact that the etching progresses much faster along the +X direction of quartz than along the −X direction. Therefore, it is possible for the etching to be diffusion controlled on one side of a doubly rotated plate but not on the other side.

According to the invention, chemical polishing can be a simple, inexpensive batch process. If good quality quartz plates are used, the process can provide high yields, with no significant Q degradation at least up to 10 MHz. Chemical polishing produces plates of extremely high strength, which reduces yield losses due to breakage during processing and provides the resonators with extremely high shock resistance. The process also reveals defects in the quartz due both to material defects and surface finishing defects to resonator instabilities and failures. The etching solutions which produce a very smooth surface on one side of doubly rotated plates and a rough surface on the other side may be useful for the chemical polishing of doubly rotated surface acoustic Wave (SAW) devices, since for SAW devices a rough surface is generally desired on one side of the plate.

We wish it to be understood that we do not desire to be limited to the exact details as described, for obvious modifications will occur to a person skilled in the art.

What is claimed is:

1. Method of chemically polishing at least one side of a doubly rotated quartz plate whose theta ($\theta$) angle is between about 33° and 36° and whose phi ($\phi$) angle is between about 10° and 26°, comprising lapping the quartz plate with an abrasive and etching the lapped quartz plate in a fluoride type etchant selected from the group consisting of about a 5 percent to 25 percent solution of hydrofluoric acid (HF), about a 5 percent to 50 percent solution of ammonium bifluoride (NH$_4$F.HF), and a mixture of 40 percent ammonium fluoride with 49 percent hydrofluoric acid in the ratio ranging from about 1:3 to 10:1, said etching being carried out until a thickness is removed from the plate that is at least twice the average abrasive particle diameter in the final lapping abrasive.

2. Method of chemically polishing both sides of a doubly rotated quartz plate whose theta ($\theta$) angle is between about 33° and 36° and whose phi ($\phi$) angle is between about 10° and 26° comprising lapping the quartz plate with an abrasive and etching the lapped quartz plate in a fluoride type etchant selected from the group consisting of about a 5 percent to 11 percent solution of hydrofluoric acid (HF), about a 5 percent to 25 percent solution of ammonium bifluoride (NH$_4$F.HF), and a mixture of 40 percent ammonium fluoride with 49 percent hydrofluoric acid in the ratios ranging from about 4:1 to 10:1 for phi angles ranging from 18° to 26° and from about 3:1 to 10:1 for phi angles ranging from 10° to 18°, said etching being carried out until a thickness is removed from the plate that is at least twice the average abrasive particle diameter in the final lapping abrasive.

3. Method according to claim 1 or claim 2 wherein the doubly rotated quartz plate to be chemically polished is SC-cut.

4. Method according to claim 1 or claim 2 wherein the doubly rotated quartz plate to be chemically polished is FC-cut.

5. Method according to claim 1 or claim 2 wherein the doubly rotated quartz plate to be chemically polished is IT-cut.

6. Method according to claim 1 wherein the fluoride type etchant is about a 5 percent to 25 percent solution of hydrofluoric acid.

7. Method according to claim 2 wherein the fluoride type etchant is about a 5 percent to 11 percent solution of hydrofluoric acid.

8. Method according to claim 1 wherein the fluoride type etchant is about a 5 percent to 50 percent solution of ammonium bifluoride.

9. Method according to claim 2 wherein the fluoride type etchant is about a 5 percent to 25 percent solution of ammonium bifluoride.

10. Method according to claim 1 wherein the fluoride type etchant is a mixture of 40 percent ammonium fluoride with 49 percent hydrofluoric acid in the ratio ranging from about 1:3 to 10:1.

11. Method according to claim 2 wherein the fluoride type etchant is a mixture of 40 percent ammonium fluoride with 49 percent hydrofluoric acid in the ratios ranging from about 4:1 to 10:1 for phi angles ranging from 18° to 26° and from about 3:1 to 10:1 for phi angles ranging from 10° to 18°.

12. Method according to claim 1 or claim 2 wherein the abrasive is selected from the group consisting of aluminum oxide, silicon carbide, cerium oxide, and zirconium oxide.

13. Method according to claim 12 wherein the abrasive is aluminum oxide.

14. Method according to claim 12 wherein the abrasive is silicon carbide.

15. Method according to claim 1 or claim 2 wherein the quartz plate is agitated during etching.

16. Method according to claim 1 or claim 2 wherein the quartz plate is cleaned prior to etching until all contaminants which are impervious to the etchant are removed.

17. Method according to claim 1 or claim 2 wherein the quartz plate is thoroughly rinsed after etching to remove all residues of the etchant.

18. Method of chemically polishing both sides of a doubly rotated SC-cut quartz plate comprising lapping the quartz plate with a 3 μm aluminum oxide abrasive and then etching the lapped plate in a mixture of 40 percent ammonium fluoride with 49 percent hydrofluoric acid in the ratio of about 4:1 at an etching bath temperature of about 75° for about 2 hours.

19. Method according to claim 18 wherein the quartz plate is agitated during etching.

20. Method according to claim 18 wherein the quartz plate is cleaned prior to etching until all contaminants which are impervious to the etchant are removed.

21. Method according to claim 18 wherein the quartz plate is thoroughly cleaned after etching to remove all residues of the etchant.

22. Method of chemically polishing one side of a doubly rotated SC-cut quartz plate comprising lapping the quartz plate with a 1 μm abrasive and then etching the lapped plate in a mixture of 40 percent ammonium fluoride with 49 percent hydrofluoric acid in the ratio of about 1:1 at an etching bath temperature of about 75° C. for about 20 minutes.

23. Method according to claim 22 wherein the quartz plate is agitated during etching.

24. Method according to claim 22 wherein the quartz plate is cleaned prior to etching until all contaminants which are impervious to the etchant are removed.

25. Method according to claim 22 wherein the quartz plate is thoroughly rinsed after etching to remove all residues of the etchant.

26. Method of chemically polishing one side of a doubly rotated SC-cut quartz plate comprising lapping the quartz plate with a 1 μm abrasive and then etching the lapped plate in a mixture of 40 percent ammonium fluoride with 49 percent hydrofluoric acid in the ratio of about 2:1 at an etching bath temperature of about 75° C. for about 30 minutes.

27. Method according to claim 26 wherein the quartz plate is agitated during etching.

28. Method according to claim 26 wherein the quartz plate is cleaned prior to etching to remove all residues of the etchant.

29. Method according to claim 26 wherein the quartz plate is thoroughly rinsed after etching to remove all residues of the etchant.

30. Method of chemically polishing both sides of a doubly rotated FC-cut quartz plate comprising lapping the quartz plate with a 1 μm aluminum oxide abrasive and then etching the lapped plate in a mixture of 40 percent ammonium fluoride with 49 percent hydrofluoric acid in the ratio of about 3:1 at an etching bath temperature of about 75° C. until about 20 μm is removed from the plate thickness.

31. Method according to claim 30 wherein the quartz plate is agitated during etching.

32. Method according to claim 30 wherein the quartz plate is cleaned prior to etching to remove all residues of the etchant.

33. Method according to claim 30 wherein the quartz plate is thoroughly rinsed after etching to remove all residues of the etchant.

34. Method of chemically polishing one side of a doubly rotated IT-cut quartz plate comprising lapping the quartz plate with a 3 μm aluminum oxide abrasive and then etching the lapped plate in a mixture of 40 percent ammonium fluoride with 49 percent hydrofluoric acid in the ratio of about 3:1 at an etching bath temperature of about 75° C. for about 75 minutes.

35. Method according to claim 34 wherein the quartz plate is agitated during etching.

36. Method according to claim 34 wherein the quartz plate is cleaned prior to etching to remove all residues of the etchant.

37. Method according to claim 34 wherein the quartz plate is thoroughly rinsed after etching to remove all residues of etchant.

38. Method of chemically polishing both sides of a doubly rotated SC-cut quartz plate comprising lapping the quartz plate with a 1 μm abrasive and then etching the lapped plate in a mixture of 40 percent ammonium fluoride with 49 percent hydrofluoric acid in the ratio of about 4:1 at an etching bath temperature of about 75° C. for about 2 hours.

39. Method according to claim 38 wherein the quartz plate is agitated during etching.

40. Method according to claim 38 wherein the quartz plate is cleaned prior to etching to remove all residues of the etchant.

41. Method according to claim 38 wherein the quartz plate is thoroughly rinsed after etching to remove all residues of etchant.

42. Method of chemically polishing both sides of a doubly rotated SC-cut quartz plate comprising lapping the quartz plate with an 1 μm abrasive and then etching the lapped plate in a mixture of 40 percent ammonium fluoride with 49 percent hydrofluoric acid in the ratio of about 5:1 at an etching bath temperature of about 80° C. until about 25 μm is removed from the plate thickness.

43. Method according to claim 42 wherein the quartz plate is agitated during etching.

44. Method according to claim 42 wherein the quartz plate is cleaned prior to etching to remove all residues of etchant.

45. Method according to claim 42 wherein the quartz plate is thoroughly rinsed after etching to remove all residues of etchant.

46. Method of chemically polishing both sides of a doubly rotated SC-cut quartz plate comprising lapping the quartz plate with a 1 μm abrasive and then etching the lapped plate in an 11 percent HF solution at an etching bath temperature of about 75° C. for about 2½ hours.

47. Method of chemically polishing both sides of a doubly rotated SC-cut quartz plate comprising lapping the quartz plate with a 1 μm abrasive and then etching the lapped plate in a dilute $NH_4F.HF$ solution prepared by mixing one part by weight of $NH_4F.HF$ flakes with five parts water at an etching bath temperature of about 75° C. for about 3 hours.

48. Method of chemically polishing a doubly rotated SC-cut quartz plate comprising final lapping the quartz plate with a 1 micrometer aluminum oxide abrasive, and then etching the final lapped quartz plate in a 4:1 solution to a range from $\Delta f = 10 f_o f_f$ to $\Delta f = 16 f_o f_f$ where $\Delta f$ is the change in frequency in $KH_z$ and $f_o$ and $f_f$ are the initial and final frequencies, respectively, in MHz.

49. Method according to claim 1 or claim 2 wherein the quartz plate is made of a material selected from the group consisting of natural quartz and swept cultured quartz.

50. Method of chemically polishing one side of a doubly rotated SC-cut quartz plate, said method consisting of the steps of (a) final lapping the quartz plate with a 1 micron aluminum oxide abrasive,
(b) thoroughly cleaning the plate,
(c) etching the plate in a mixture of 40 percent ammonium fluoride with 49 percent hydrofluoric acid in the ratio of about 1:3 while agitating the plate in both directions,
(d) etching the plate until an amount of material is removed from the plate such that the thickness of the plate is reduced by an amount which is equal to at least twice the average particle size in the final lapping abrasive, and
(e) removing the plate from the etching solution after the desired frequency is reached and thoroughly rinsing the plate to remove all residues of the etchant.

51. Method of chemically polishing both sides of a doubly rotated SC-cut quartz plate, said method consisting of the steps of (a) final lapping the quartz plate with a 1 micron aluminum oxide abrasive,
(b) thoroughly cleaning the plate,
(c) etching the plate in a mixture of 40 percent ammonium fluoride with 49 percent hydrofluoric acid in the ratio of about 10:1 while agitating the plate in both directions,
(d) etching the plate until an amount of material is removed from the plate such that the thickness of the plate is reduced by an amount which is equal to at least twice the average particle size in the final lapping abrasive, and
(e) removing the plate from the etching solution after the desired frequency is reached and thoroughly rinsing the plate to remove all residues of the etchant.

* * * * *